(12) United States Patent
Keller

(10) Patent No.: US 12,378,079 B2
(45) Date of Patent: Aug. 5, 2025

(54) TRANSPORT SYSTEM FOR ORDER-PICKING

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 277 days.

(21) Appl. No.: 17/913,436

(22) PCT Filed: Mar. 1, 2021

(86) PCT No.: PCT/EP2021/055018
§ 371 (c)(1),
(2) Date: Sep. 22, 2022

(87) PCT Pub. No.: WO2021/190865
PCT Pub. Date: Sep. 30, 2021

(65) Prior Publication Data
US 2023/0159275 A1    May 25, 2023

(30) Foreign Application Priority Data
Mar. 23, 2020    (DE) .................... 10 2020 107 927.3

(51) Int. Cl.
*B65G 1/137*    (2006.01)
*B66F 9/06*    (2006.01)
*B66F 9/075*    (2006.01)

(52) U.S. Cl.
CPC ............ *B65G 1/1375* (2013.01); *B66F 9/063* (2013.01); *B66F 9/0755* (2013.01)

(58) Field of Classification Search
CPC .. B66F 9/127; B66F 9/063; B66F 9/06; B66F 9/0755; B66F 17/003; B65G 1/1375
(Continued)

(56) References Cited

U.S. PATENT DOCUMENTS 3,090,494 A  *  5/1963  Thiele ........................ B66F 9/06
                                                            212/75
5,149,241 A     9/1992  Haymore et al.
(Continued)

FOREIGN PATENT DOCUMENTS

CN    103738888 A    4/2014
CN    109132952 A    1/2019
(Continued)

*Primary Examiner* — Glenn F Myers
(74) *Attorney, Agent, or Firm* — Norman B. Thot

(57) ABSTRACT

A transport system for picking products and/or goods. The transport system includes an order-picking device with a rigid base frame and a transport and/or work platform, and two individual vehicles each of which are couplable to the order-picking device and each of which have a drive device, a steering device, and a lifting device which can raise and lower a load-carrying device. The two individual vehicles, when in a decoupled state from the order-picking device, are each operatable completely independently of one another, and, when in a coupled state to the order-picking device, are coupled with the order-picking device so as to provide a driving and steering behavior of a rigid overall vehicle made up of the two individual vehicles and the order-picking device, and a lifting behavior of a complete lifting device made up of the lifting device of each of the two individual vehicles.

18 Claims, 4 Drawing Sheets

(58) Field of Classification Search
USPC .................. 414/332, 458, 459, 460, 461
See application file for complete search history.

(56) References Cited

U.S. PATENT DOCUMENTS

| | | | |
|---|---|---|---|
| 6,860,698 B1 | 3/2005 | Viragh et al. | |
| 2006/0115353 A1* | 6/2006 | Berends | B66F 3/46 |
| | | | 414/458 |
| 2009/0238669 A1 | 9/2009 | Hathaway et al. | |
| 2016/0101970 A1* | 4/2016 | Taki | B66F 17/003 |
| | | | 701/50 |
| 2020/0081438 A1* | 3/2020 | Vance | B25J 13/085 |
| 2020/0406733 A1* | 12/2020 | Yamamoto | B60P 1/02 |

FOREIGN PATENT DOCUMENTS

| | | |
|---|---|---|
| DE | 41 26 728 A1 | 2/1993 |
| DE | 43 30 836 A1 | 3/1994 |
| DE | 600 05 207 T2 | 7/2004 |
| DE | 10 2007 054 836 A1 | 5/2009 |
| DE | 10 2009 051 785 A1 | 5/2011 |
| EP | 2 017 218 A1 | 1/2009 |

* cited by examiner

TRANSPORT SYSTEM FOR ORDER-PICKING

CROSS REFERENCE TO PRIOR APPLICATIONS

This application is a U.S. National Phase application under 35 U.S.C. § 371 of International Application No. PCT/EP2021/055018, filed on Mar. 1, 2021 and which claims benefit to German Patent Application No. 10 2020 107 927.3, filed on Mar. 23, 2020. The International Application was published in German on Sep. 30, 2021 as WO 2021/190865 A1 under PCT Article 21(2).

FIELD

The present invention relates to a transport system for picking products and/or goods, having an order-picking device, or an order-picking platform, which has a rigid base frame and a work and/or transport platform for picking and transporting goods, in particular, to or from a shelf.

BACKGROUND

Such order-picking devices are known in a variety of different designs and are used to store and retrieve goods and load units, in particular to and from a shelf. Such goods can include all sizes, such as both small parts and large goods, and in particular goods arranged on pallets. Special designs of order-picking devices, and in particular picking vehicles, can also be used to assemble selected partial quantities of goods. The storage and retrieval of partial quantities is usually performed manually by an operator or driver of the vehicle. In order to simplify storage and retrieval for the operator and to improve safety when working at great heights, such vehicles are usually designed exclusively for order-picking and are appropriately equipped for this purpose alone.

In a number of companies, there is a desire for space-saving shelf storage and an order-picking device suitable for this purpose, however, the need for storage and retrieval is often not sufficiently large so that it is often the case that the investment costs for such an order-picking device intended only for this purpose are not justified. A long service life of the order-picking device is to be expected, in particular, with relatively few storage or retrieval processes, which, in addition to the investment costs, can also be relatively costly in terms of maintenance and operating costs.

SUMMARY

An aspect of the present invention is to provide a transport system for an order-picking device that improves at least one of the above-mentioned disadvantages and, in particular, is versatile and enables a safe and cost-effective picking.

In an embodiment, the present invention provides a transport system for picking at least one of a product and a good. The transport system includes an order-picking device comprising a rigid base frame and a transport and/or work platform, and at least two individual vehicles each of which are configured to be couplable to the order-picking device and each of which comprise a drive device, a steering device, and a lifting device which is configured to raise and to lower a load-carrying device. The at least two individual vehicles, when in a decoupled state from the order-picking device, are each operatable completely independently of one another, and, when in a coupled state to the order-picking device, are coupled with the order-picking device so as to provide a driving and steering behavior of a rigid overall vehicle comprising the at least two individual vehicles and the order-picking device, and a lifting behavior of a complete lifting device comprising the lifting device of each of the at least two individual vehicles.

BRIEF DESCRIPTION OF THE DRAWINGS

The present invention is described in greater detail below on the basis of embodiments and of the drawings in which.

DETAILED DESCRIPTION

Figure 1:
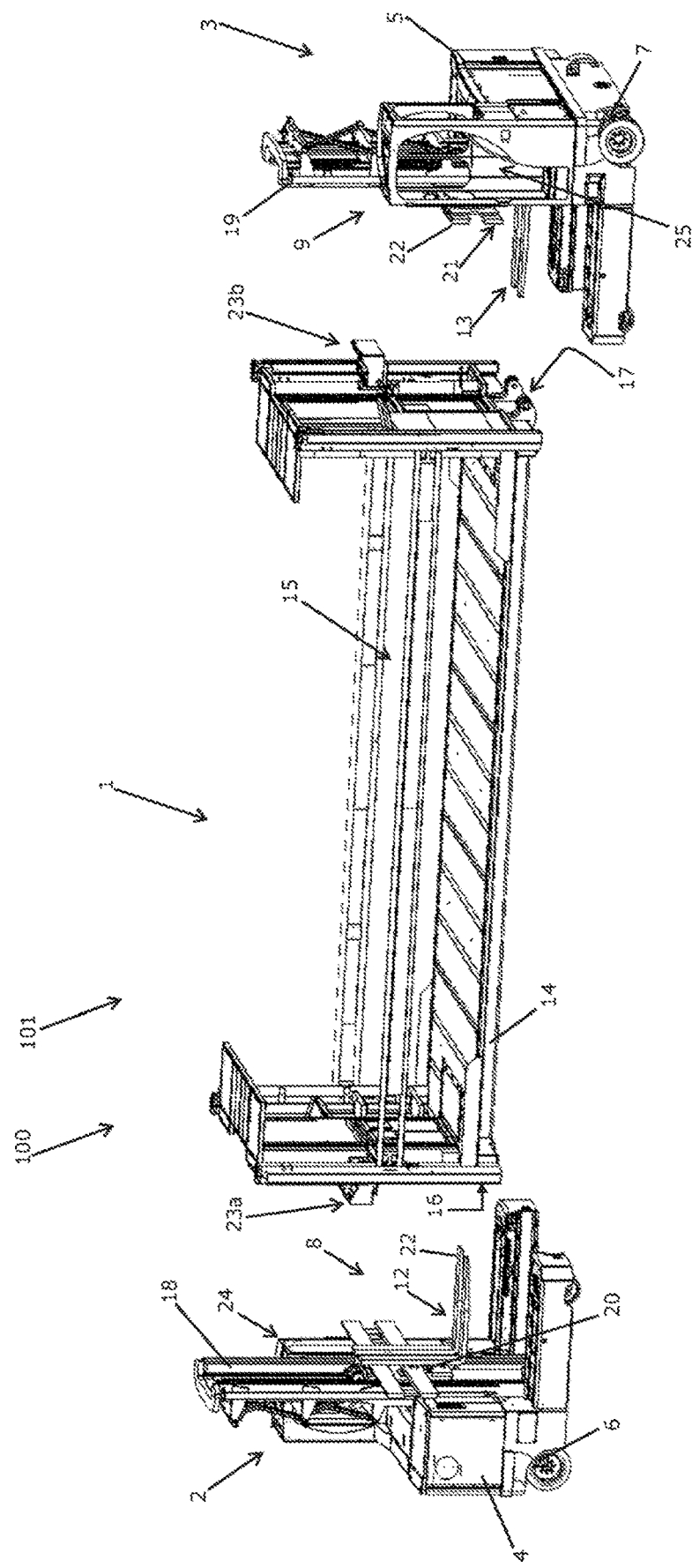
FIG. 1 shows a perspectival view of a transport system according to the present invention in the decoupled state of the components.

According to the present invention, the variable transport system has at least two individual vehicles that are couplable and also, optionally, linkable to the separately designed order-picking device, each of which has a drive device provided for moving, and in particular driving, the individual vehicle, a steering device, and a lifting device for raising and lowering a load-carrying device. This makes it possible to arrange the components that are particularly cost-intensive for an order-picking device, especially the driving and lifting devices, on a vehicle that can also be used for other purposes, in order to be able to significantly reduce, in particular the investment and operating costs for an order-picking device. The order-picking device can in particular be designed as a simple platform, in particular without its own drive and/or wheels.

For this purpose, the individual vehicles can each be operated and driven completely independently of one another in a state in which they are decoupled from the order-picking device. They can in particular be moved and steered independently of one another and controlled independently of one another with respect to the lifting device.

The individual vehicles are thereby not only highly maneuverable, require little space to maneuver, and space-saving to park when not in use, but are also versatile for other purposes. The individual vehicles can, for example, be used as lift mast forklift trucks or forklifts for other purposes while the order-picking device can remain at its intended location.

In a state coupled and optionally also linked to the order-picking device, the individual vehicles are coupled to one another according to the present invention so that there is brought about the driving and steering behavior of a rigid overall vehicle comprising the couplable individual vehicles and the order-picking device, and the lifting behavior of a complete lifting device comprising the lifting devices.

The individual vehicles coupled to one another can be steered, for example, with only a single steering element of an overall vehicle steering transmitter, which is part of an overall vehicle control device, e.g., a steering transmitter equipped with a steering wheel, in the same way as an individual vehicle that is rigid from the outset, in which all wheel arrangements are fixed in relation to the other wheel arrangements of the vehicle. This in particular prevents the vehicles from having to be steered separately from one another during transport, which would theoretically be possible for experienced operators, but is hardly conceivable in practice.

With regard to the complete lifting device, the movements of the two lifting devices of the two individual vehicles can in particular be coordinated with one another. They are in particular controlled together so that both lifting devices are always arranged at the same height relative to a chassis of the individual vehicle.

In a very simple embodiment, the order-picking device can comprise only the base frame with a walk-on platform and a fall protection system. An operator or driver of the system can thus walk on the transport and work platform and store and retrieve the goods to be picked manually or with technical assistance on a shelf. In order to be able to store and retrieve particularly long loads, the base frame can, for example, have a length that can be significantly greater than its width. The side of the order-picking device on which picking can take place is, for example, a longitudinal side of the order-picking device. Picking can, for example, take place on both opposite longitudinal sides of the order-picking device. This means that long goods, in particular such as panels and doors, can be picked particularly safely and in a particularly simple manner.

The load-carrying device of the individual vehicles can, for example, comprise fork prongs of an ordinary forklift that, particularly in a state decoupled from the order-picking device, are suitable for picking up, carrying, and depositing loads or goods, in particular at least one transport pallet. The order-picking device can as a result be coupled and used in a variety of ways.

In the coupled state, the individual vehicles and the order-picking device can, for example, be coupled to one another with the formation of a positive-locking fit, in particular without articulation. In the coupled state, the individual vehicles and the order-picking device are in particular rigidly aligned relative to one another. This also makes the overall vehicle suitable for order-picking and transporting particularly large and/or heavy goods. A comfortable driving behavior is also made possible, in particular in an aisle between two shelves.

The load-carrying device can, for example, comprise a coupling for coupling the individual vehicle to the order-picking device, or the load-carrying device is designed as a coupling. The coupling may, for example, comprise a bellows connection via which the order-picking device can be securely fastened to the respective individual vehicle.

In the coupled state, the load-carrying device of the lifting device can, for example, be arranged (in particular with the coupling) in at least one load carrier receptacle formed on the base frame of the order-picking device. The coupling can, for example, be inserted into a corresponding load carrier receptacle and locked against release with the order-picking device. The individual vehicles and the order-picking device are in particular each connected to one another with the formation of a positive-locking fit.

The order-picking device can, for example, be substantially rectangular in a horizontal projection plane, and the individual vehicles in the coupled state can, for example, each be arranged on the narrow side or on the end side of the order-picking device. In other words, the order-picking device can, for example, have a length that is significantly greater than its width. The load carrier receptacle can, for example, consequently also be arranged on two opposite end sides of the order-picking device. This allows for a particularly narrow overall vehicle which is in particular advantageous for narrow shelf aisles. A third load carrier receptacle can also be provided on at least one longitudinal side of the order-picking device.

The load-bearing device can, for example, be operatively connected to at least one force sensor for detecting the forces acting, in particular in the coupled state, on the coupling. This means that a possible overload of individual components of the entire vehicle can be rapidly detected and effectively prevented.

The at least one force sensor can be coupled to the drive device and/or the steering device of at least one of the individual vehicles so that the drive device and/or the steering device of the at least one individual vehicle can be influenced in the sense of reducing the forces acting on the coupling. In other words, depending upon the detected forces acting on the coupling, the power called up by the drive device and/or the steering setpoints specified by the steering device can be corrected so that this leads to a reduction in the forces acting on the coupling. A faulty actuation of the drive and/or steering devices of the individual vehicles, to the effect that the drive powers and/or the steering commands are not exactly matched to those of the other individual vehicles, can thereby be corrected automatically.

In an embodiment, the at least one force sensor can, for example, be designed so that it detects forces, acting approximately parallel to the ground on the coupling, with regard to the magnitude and direction of the force. The at least one force sensor can be designed, for example, as a biaxially-acting force transducer therefor.

In order to be able to process the force measurement values and force measurement directions detected by the at least one force sensor, the transport system can, for example, comprise central electronics, also referred to as an overall vehicle control device, via which the open-loop or closed-loop control of both the drive devices and the steering devices, along with the lifting devices of the individual vehicles coupled to the order-picking device, can be effected. The at least one force sensor can be connected to the central electronics so that the open-loop or closed-loop control variables provided by the central electronics for the drive and/or steering devices are reduced, in the sense of reducing the forces acting on the coupling.

In the coupled state, the order-picking device can, for example, be displaced in height via the complete lifting device, and in particular relative to the chassis of the individual vehicles. This means that even large heights, as with a shelf, can be approached with the order-picking device for storing and retrieving goods.

In the coupled state, the individual vehicles (in particular as an overall vehicle) and the lifting devices (in particular as a complete lifting device) can, for example, be controlled from the order-picking device, in particular from a control panel provided on the transport and/or work platform. In this embodiment, the individual vehicles are each additionally coupled to the order-picking device, in particular via a wired or, for example, a wireless interface. Functions of the order-picking device can also optionally be controlled from the transport and/or work platform of the order-picking device.

In the coupled state, at least the individual vehicles and, optionally, also the order-picking device can, for example, be wirelessly coupled to one another, in particular via a radio link. This makes it particularly fast and easy to produce an overall vehicle control system.

The order-picking device can, for example, be suitable for picking particularly large, and in particular long, goods. Such large goods can, for example, be panels and/or doors. In the coupled state, the individual vehicles can, for example, be coupled to the order-picking device so that, for example, in a shelf aisle, a particularly simultaneous picking is possible on two opposite longitudinal sides of the order-picking device. This enables a particularly rapid picking. If the width of a shelf aisle is only slightly greater than the width of the overall vehicle, the overall vehicle can in particular extend longitudinally in the direction of the shelf aisle, and picking can take place on two shelves simultaneously, in particular without having to move the overall vehicle.

The lifting device can, for example, comprises a lift mast, wherein, in the decoupled state, the load-carrying device can be displaced in height along the lift mast, and, in the coupled state, the order-picking device can be displaced in height along the lift mast, in particular relative to the chassis of the individual vehicles. This makes the transport system particularly versatile.

Each individual vehicle can, for example, be designed as a lift mast forklift truck. This means that the transport system can be integrated into an existing fleet. The order-picking device can in particular be coupled with other individual vehicles designed as lift mast forklifts.

Each individual vehicle can, for example, have at least three wheels. All three wheels can in particular be designed as steerable wheels so that no or only very slight slippage can occur at individual wheels in an overall vehicle. The order-picking device can, for example, not include wheels.

The steering device can, for example, comprise an all-wheel steering device with various steering programs. This enables a particularly convenient operation of the entire vehicle. The overall vehicle control device can also have different steering programs. Depending upon the respective steering program, the individual wheels are then actuated in the sense of an optimum steering angle for the desired driving state, taking into account the steering commands specified, for example, by the overall control device and the transmitted distance between the individual vehicles. Depending upon the steering program, the wheel axles of all wheels on the individual vehicles run more or less in a common steering pole (e.g., when driving around curves or carousels). The wheel axles of all wheels of all individual vehicles can also run approximately parallel to one another, for example, during a forward, transverse, or diagonal movement. Only the wheels of a first individual vehicle serving as a control vehicle can, for example, alternatively steer, while the wheels of the second individual vehicle are arranged rigidly or non-rotatably as followers.

In an embodiment of the transport system, at least one of the individual vehicles can, for example, have a distance detection device and an overall vehicle control system or overall vehicle control device, wherein the distance detection device is provided, in the coupled state, for detecting the respective distance between the coupled individual vehicles and in particular for determining an overall vehicle dimension, in particular, for determining the possible steering angles, and the overall vehicle control device is provided for actuating at least the steering device of the coupled individual vehicles. The distance detection device can in particular interact with the aforementioned overall vehicle control device. The distance detection device can be used to determine the distance between the individual vehicles coupled to the order-picking device relative to one another. This means that the individual vehicles may be coupled and optionally linked particularly rapidly and easily with order-picking devices of, in particular, different lengths. The individual vehicles may, for example, be coupled, as required, with a relatively short order-picking device suitable for particularly heavy goods or with a particularly long order-picking device suitable for particularly long goods. Precise knowledge of the distance between the two individual vehicles relative to one another in the coupled state is of particular importance since this can influence a steering angle by which each steering device can be actuated to achieve a specific driving state. The steering angle in particular depends upon the distance between the vehicles relative to one another when one or more wheels are to be prevented from turning when driving around curves or carousels, which requires that the wheel axles all intersect at a single pole, i.e., the steering pole. The measured distance value is then applied to the overall vehicle control device. The distance detection device can be constructively formed by a laser-based or radar-based distance detection device. The distance detection device can, for example, be designed so that it detects the distance between the individual vehicles relative to one another at several points.

In an embodiment, the drive devices of the individual vehicles can, for example, also be operatively connected to the overall vehicle control device so that the drive devices can be controlled in the coupled state, taking into account the distance, the steering program, and the steering setpoint specified by means of the complete steering transmitter, so that the speed of the driven wheels can be adapted to the respective driving state in the sense of avoiding slippage between the wheel surface and the ground. For a carousel drive around a pivot point, those driven wheels that are farther away from the pivot point would, for example, have higher drive power applied to them than those closer to the pivot point.

The present invention also relates to such an order-picking device for such a transport system.

An exemplary embodiment of the present invention is explained in greater detail below under reference to the drawings. Similar reference signs thereby denote similar components.

The exemplary embodiment 100 of the variable transport system according to the invention shown in FIGS. 1 through 4 comprises an order-picking device 1 and two individual vehicles 2, 3. It is of course possible for additional individual vehicles and/or order-picking devices to be associated with the variable transport system 100.

In a decoupled state 101 depicted in FIG. 1, decoupled from the order-picking device 1, the individual vehicles 2, 3 can each be moved and operated independently of one another. In the coupled state 102 shown in FIGS. 2, 3 and 4, the order-picking device 1 and the two individual vehicles 2, 3 together form a rigid overall vehicle 10 with a complete lifting device 11 formed by the lifting devices 8 and 9 of the individual vehicles 2, 3 for raising and lowering the order-picking device 1.

The individual vehicles 2, 3 can be operated independently in particular in the decoupled state 101. For this purpose, the individual vehicles 2, 3 each have a chassis standing on at least three, and in this case four, wheels, a driving and operating stand 24 or 25 for operating the vehicle 2, 3, and a drive device 4 or 5 and a steering device 6 or 7 for driving the vehicle 2, 3. In the present case, at least two of the four wheels of each individual vehicle 2, 3 are driven by the drive device 4 or 5, and all four wheels can be steered by the steering device 6 or 7.

In the present case, the respective steering device 6, 7 is designed as a steering control system known per se, wherein the usual additional functions are possible. For example, a radio remote control device separate from the respective individual vehicle 2, 3 can be provided. These may, for example, comprise a steering setpoint transmitter coupled to a steering wheel, and a drive power transmitter coupled to an actuating lever. The steerable wheels can each be steered around a steering axis via the respective steering wheel. The respective actuating lever can be used to influence the drive power with which the driven wheels (in this case, likewise all four wheels) are driven and thus the driving speed of the respective individual vehicle 2, 3. The steering device 6, 7 can additionally comprise an all-wheel steering device with various steering programs. This enables a steering behavior that can be advantageous, in particular in the coupled state 102.

The individual vehicles 2, 3 are each in particular designed as a lift mast forklift vehicle with the driving and operating stand 24, 25 and a lifting device 8, 9 for raising and lowering the load-carrying device 12, 13. The lift mast forklift trucks 2, 3 may, for example, be designed to be ordinary forklift vehicles.

The lifting device 8, 9 comprises a lift mast 18, 19 and the load-carrying device 12, 13, which is height-adjustable thereon. The load-carrying device 12, 13 comprises two fork prongs which are designed to receive pallets, such as, for example, a Euro pallet.

The load-carrying device 12, 13 additionally comprises at least one coupling 20, 21 for coupling the individual vehicle 2, 3 to the order-picking device 1. The coupling 20, 21 is designed as a bellows receptacle flanged to the load-carrying device 12, 13, and in particular to a vertical section of the load-carrying device 12, 13. The load-carrying device 12, 13 itself, and in particular the fork prongs, can alternatively form the coupling 20, 21 for coupling to the order-picking device 1.

The load-carrying device 12, 13 is operatively connected to at least one force sensor 22 for detecting the forces acting (in particular in the coupled state 102) on the coupling 20, 21. The at least one force sensor 22 is coupled to the drive device 4, 6 and/or to the steering device 6, 7 of at least one of the individual vehicles 2, 3 so that the drive device 4, 6 and/or the steering device 6, 7 of the at least one individual vehicle 2, 3 can be influenced in the sense of reducing the forces acting on the coupling 20, 21.

The order-picking device 1 comprises a rigid base frame 14 with a transport and work platform 15 arranged thereon for transporting and picking goods (not shown here). The transport and work platform 15 is used for entry and access by an operator of the order picker and has side guardrails for this purpose. The transport and work platform 15 also serves as a loading area for the goods to be picked. As can in particular be seen in FIG. 2, the order-picking device 1 in the coupled state 102 to the individual vehicles 2, 3 is suitable for (e.g., simultaneous) picking on both of its opposite longitudinal sides. This enables a particularly rapid picking. In particular if the width of a shelf aisle (not shown here) is only slightly greater than the width of the overall vehicle 10, it is possible (if the overall vehicle 10 is arranged with its longitudinal extension in the direction of the shelf aisle) to carry out picking on both sides of the order-picking device simultaneously, and in particular without having to move the overall vehicle. In order to pick large, long goods, such as panels or doors, the two aforementioned sides for picking are in particular the longitudinal sides of the order-picking device 1.

The order-picking device 1 is designed to be substantially rectangular in shape when viewed in a horizontal projection plane or in a top view and in particular has a longitudinal extension with two longitudinal sides and two narrow end sides. A load carrier receptacle 16, 17, to which the individual vehicles 2, 3 may be coupled to the order-picking device 1, is provided on each of the narrow end sides of the order-picking device 1 or of the base frame 14. In the present case, the load carrier receptacles 16, 17 are each designed as projecting bellows receptacles, which correspond to the coupling 20, 21 of the individual vehicles 2, 3.

By correspondingly driving an individual vehicle 2, 3 with the coupling 20, 21 up to the load carrier receptacle 16, 17, and by inserting or closing a bolt between the coupling 20, 21 and the load carrier receptacle 16, 17, the order-picking device 1 can be firmly connected to the respective individual vehicle 2, 3, with the formation of a positive-locking fit. This in particular rigidly connects the order-picking device 1 and the respective individual vehicle 2, 3 to one another. The vehicle parts 1, 2, 3 are in particular connected to one another in a non-articulated manner, where "non-articulated" means that the overall vehicle is not designed to be articulated in its longitudinal extension, and in particular not articulated about a vertical axis of rotation.

As an alternative to the aforementioned embodiment, the positive-locking fit between the order-picking device 1 and the respective individual vehicle 2, 3 can also be achieved by means of another embodiment. For example, the fork prongs of the load-carrying device 12, 13 of the individual vehicle 2, 3 can be inserted into at least one load carrier receptacle provided on the base frame 14 of the order-picking device 1 and locked against release, which also enables a rigid connection between the order-picking device 1 and the respective individual vehicle 2, 3.

Figure 2:
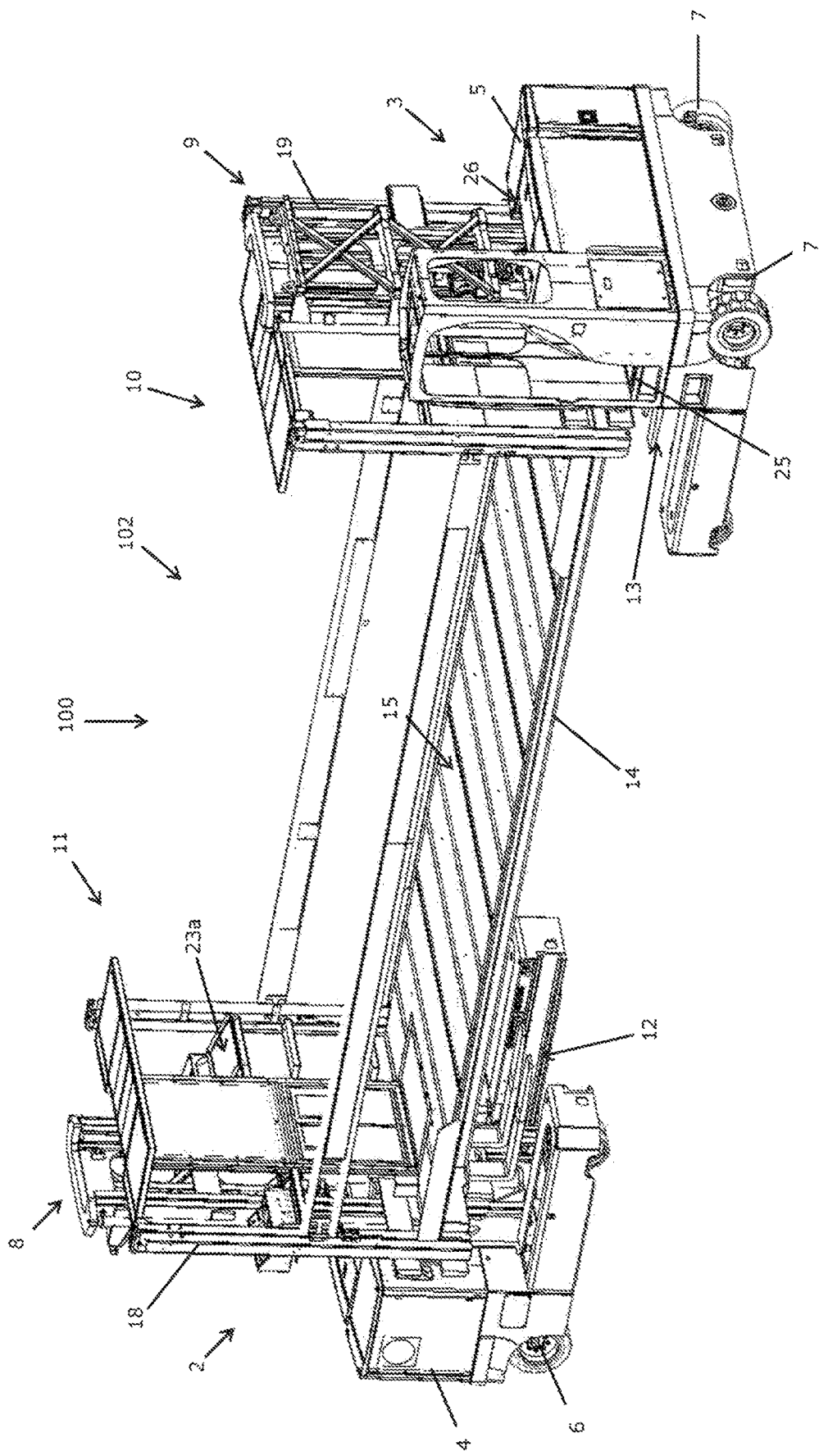
FIG. 2 shows a perspectival view of the transport system according to the present invention in the coupled state of the components.
Figure 3:
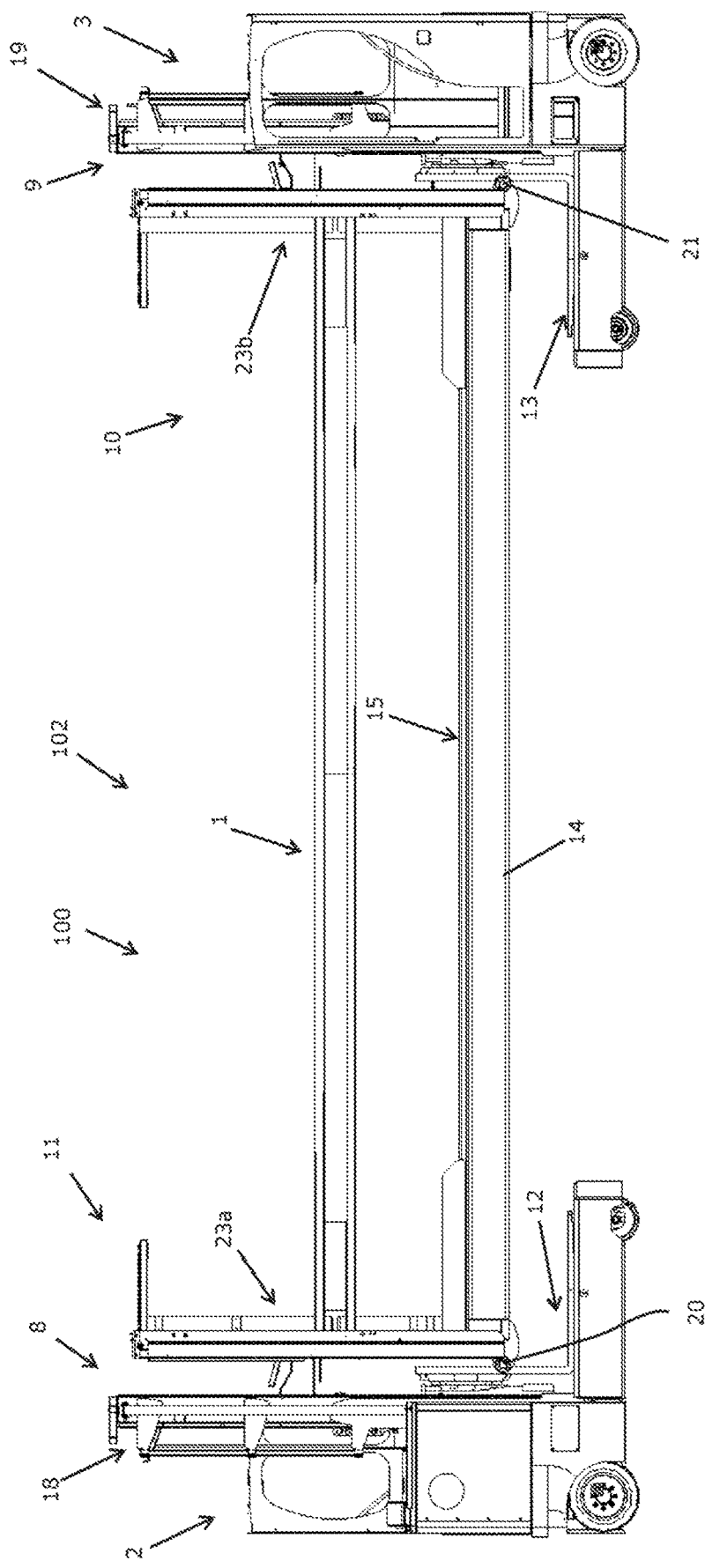
FIG. 3 shows a side view of the transport system according to the present invention in the coupled state of the components.
Figure 4:
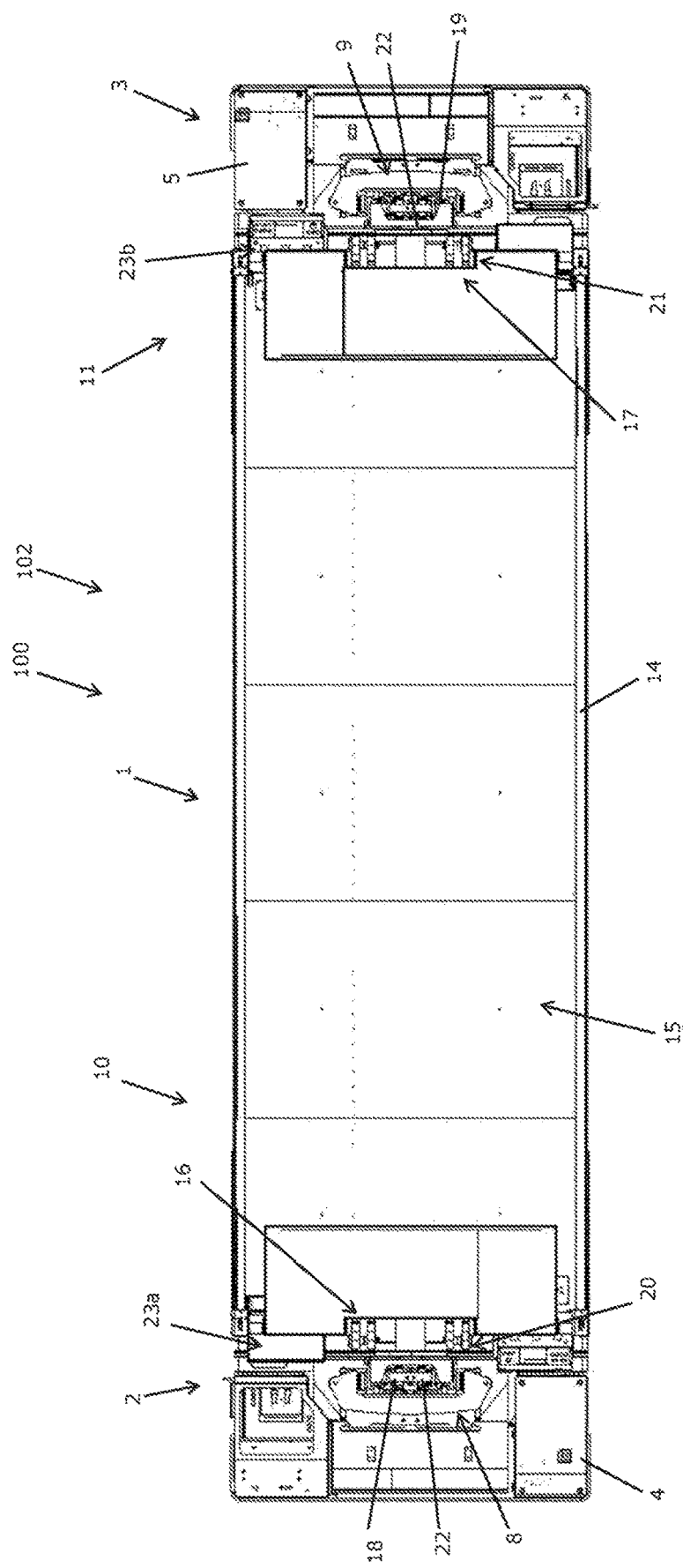
FIG. 4 shows a top view of the transport system according to the present invention in the coupled state of the components.

In the coupled state 102 shown in FIGS. 2 through 4, coupled and, optionally, electrically linked to the order-picking device 1, the individual vehicles 2, 3 are coupled to one another so that there is brought about driving and steering behavior of the formed overall vehicle 10 and lifting behavior of a complete lifting device 11 comprising the lifting devices 8, 9. This can be provided, for example, by an overall vehicle control device 26 for controlling and operating the overall vehicle. This means that the three aforementioned components, and specifically the order-picking device 1 and the individual vehicles 2, 3, form a rigidly interconnected overall vehicle 10 which can be controlled via a common overall vehicle control device 26 (central electronics). The coupling of at least the two individual vehicles 2, 3 is thereby, for example, wireless, in particular, via a radio link.

The two individual vehicles 2, 3 may in principle also each be operated separately from one another by the steering and drive devices 4, 5; 6, 7 in the coupled state 102 coupled to the order-picking device 1. In order to avoid mechanical overloads of parts of the transport system due to uncoordinated actuation parameters, force sensors 22, which are not visible in the drawing, are provided on the coupling 20, 21. The forces detected by the force sensors 22 parallel to the ground are transmitted to the overall vehicle control device 16. This overall vehicle control device 26 corrects the drive power and steering parameters to which the driven and/or steered wheels are subjected so that the forces, detected via the force sensors 22, on the coupling 20, 21 are as low as possible.

For the exemplary embodiment shown in the figures, the overall vehicle control device 26 additionally comprises an overall vehicle steering transmitter (not shown) which is coupled to a steering wheel, along with an overall lifting control device (not shown) which is coupled to the lifting devices 8, 9. The overall vehicle control device 26 works together with the two individual vehicles 2, 3 so that they are electronically coupled to one another via the overall vehicle control device 26 and behave as if they were a rigid vehicle combination 10 in terms of driving and steering behavior, and as if they were a complete lifting device 11 in terms of lifting behavior.

The latter in particular enables the order-picking device 1 to be raised and lowered uniformly via the individual lifting devices 8 and 9. As a result, the load-carrying device 12, 13 in the decoupled state 101 for raising and lowering individual goods and in the coupled state 102 for raising and lowering the order-picking device 1 can be uniformly displaced in height along the lifting mast 18, 19, and in particular relative to the chassis of the individual vehicles.

To enable a particularly efficient operation of the transport system in the coupled state 102, the vehicle parts forming the overall vehicle 10, and in particular the individual vehicles 2, 3, may be controlled entirely from at least one control panel 23a, 23b arranged on the order-picking device 1. An operation of driving the individual vehicles 2, 3, the raising and lowering of the order-picking device 1, and, optionally, the retrieval of further data at the control panel 23a, 23b are in particular made possible. Further functions of the order-picking device 1 can also optionally be controlled from the transport and/or work platform 15, and in particular at the control panel 23a, 23b. In this embodiment, the individual vehicles 2, 3 are each additionally coupled to the order-picking device 1, and in particular via a wired or wireless interface.

It should be clear that the scope of protection of the present invention is not limited to the exemplary embodiment described. The structure of the order-picking device and the individual vehicles can in particular certainly be modified without changing the core of the present invention. Reference should also be had to the appended claims.

LIST OF REFERENCE NUMERALS

1 Order-picking device
2 Individual vehicle
3 Individual vehicle
4 Drive device
5 Drive device
6 Steering device
7 Steering device
8 Lifting device
9 Lifting device
10 Overall vehicle
11 Complete lifting device
12 Load-carrying device
13 Load-carrying device
14 Base frame
15 Transport and/or work platform
16 Load carrier receptacle
17 Load carrier receptacle
18 Lift mast
19 Lift mast
20 Coupling
21 Coupling
22 Force sensor
23a Control panel
23b Control panel
24 Driving and operating stand
25 Driving and operating stand
26 Overall vehicle control device
100 Transport system
101 Decoupled state
102 Coupled state

What is claimed is:

1. A transport system for picking at least one of a product and a good, the transport system comprising:
    an order-picking device comprising a rigid base frame and a transport and/or work platform; and
    at least two individual vehicles each of which are configured to be couplable to the order-picking device and each of which comprise a drive device, a steering device, and a lifting device which is configured to raise and to lower a load-carrying device,
    wherein,
    the at least two individual vehicles, when in a decoupled state from the order-picking device, are each operatable completely independently of one another, and, when in a coupled state to the order-picking device, are coupled with the order-picking device so as to provide a driving and steering behavior of a rigid overall vehicle comprising the at least two individual vehicles and the order-picking device, and a lifting behavior of a complete lifting device comprising the lifting device of each of the at least two individual vehicles,
    wherein,
    the transport and/or work platform is configured so that an operator or driver of the transport system can walk on the transport and/or work platform and store and retrieve the at least one of the product and the good to be picked either manually or with technical assistance on a shelf, and
    in the coupled state, each of the at least two individual vehicles and each respective lifting device thereof is controllable from the order-picking device.

2. The transport system as recited in claim 1, wherein, in the coupled state, the at least two individual vehicles and the order-picking device are coupled to one another with a formation of a positive-locking fit.

3. The transport system as recited in claim 2, wherein the positive-locking fit is without articulation.

4. The transport system as recited in claim 1, wherein,
    the load-carrying device comprises a coupling for coupling the individual vehicle to the order-picking device, or
    the load-carrying device is designed as a coupling.

5. The transport system as recited in claim 4, wherein the load-carrying device is operatively connected to at least one force sensor which is configured to detect a force acting on the coupling.

6. The transport system as recited in claim 1, wherein,
    the order-picking device further comprises at least one load carrier receptacle which is formed on the rigid base frame, and
    in the coupled state, the load-carrying device is arranged in the at least one load carrier receptacle.

7. The transport system as recited in claim 6, wherein the at least one force sensor is coupled to at least one of the drive device and the steering device of at least one of the at least two individual vehicles so that the at least one of the drive device and the steering device of the at least one of the at least two individual vehicles are influenceable in the sense of reducing the force acting on the coupling.

8. The transport system as recited in claim 1, wherein,
    the order-picking device further comprises a longitudinal extension, and each of the at least two individual vehicles, in the coupled state, are arranged on one respective end side of the order-picking device.

9. The transport system as recited in claim 1, wherein, in the coupled state, the order-picking device is displaceable in height via the complete lifting device.

10. The transport system as recited in claim 1, wherein, in the coupled state, each of the at least two individual vehicles and each respective lifting device thereof is controllable, as a complete lifting device, from the transport and/or work platform of the order-picking device.

11. The transport system as recited in claim 1, wherein, in the coupled state, the at least two individual vehicles are wirelessly coupled to one another.

12. The transport system as recited in claim 1, wherein, in the coupled state, the at least two individual vehicles are coupled to the order-picking device so as to make possible a picking on two opposite longitudinal sides of the order-picking device.

13. The transport system as recited in claim 1, wherein,
each lifting device of the at least two individual vehicles comprises a lift mast,
in the decoupled state, the load-carrying device is configured to be displaceable in height along the lift masts, and
in the coupled state, the order-picking device is displaceable in height along the lift masts.

14. The transport system as recited in claim 1, wherein each of the at least two individual vehicles is designed as a lift mast forklift truck.

15. The transport system as recited in claim 1, wherein each of the at least two individual vehicles further comprises at least three wheels.

16. The transport system as recited in claim 1, wherein the steering device comprises an all-wheel steering device with various steering programs.

17. The transport system as recited in claim 1, wherein,
at least one of the at least two individual vehicles further comprises a distance detection device and an overall vehicle control device,
the distance detection device is provided in the coupled state to detect a respective distance between the at least two individual vehicles coupled to the order-picking device, and
the overall vehicle control device (26) is provided to actuate at least the steering device of each of the least two individual vehicles coupled to the order-picking device.

18. An order-picking device for a transport system as recited in claim 1.

* * * * *